(12) United States Patent
Kikkawa

(10) Patent No.: US 8,760,523 B2
(45) Date of Patent: Jun. 24, 2014

(54) VIDEO DISPLAY APPARATUS, CONTROL METHOD FOR VIDEO DISPLAY APPARATUS, VIDEO OUTPUT APPARATUS, AND CONTROL METHOD FOR VIDEO OUTPUT APPARATUS

(75) Inventor: Teruki Kikkawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 12/872,362

(22) Filed: Aug. 31, 2010

(65) Prior Publication Data
US 2011/0221976 A1  Sep. 15, 2011

Related U.S. Application Data

(63) Continuation of application No. PCT/JP2010/053836, filed on Mar. 10, 2010.

(51) Int. Cl.
*H04N 5/225* (2006.01)
*H04N 5/232* (2006.01)
*H04N 5/222* (2006.01)

(52) U.S. Cl.
USPC ............ 348/207.99; 348/207.1; 348/211.1; 348/333.01; 348/333.13

(58) Field of Classification Search
USPC ............ 348/207.99, 207.1, 211.1, 333.13, 348/333.05–333.12, 552
See application file for complete search history.

(56) References Cited

U.S. PATENT DOCUMENTS

| | | | |
|---|---|---|---|
| 2005/0027993 A1* | 2/2005 | Yanagisawa | 713/189 |
| 2005/0068346 A1* | 3/2005 | Ogawa et al. | 345/699 |
| 2006/0242669 A1* | 10/2006 | Wogsberg | 725/74 |
| 2007/0057931 A1* | 3/2007 | Takamori | 345/204 |
| 2007/0064093 A1* | 3/2007 | Nam et al. | 348/14.02 |
| 2007/0283071 A1* | 12/2007 | Konishi | 710/302 |
| 2008/0152322 A1 | 6/2008 | Onoda | |
| 2008/0180551 A1* | 7/2008 | Koike | 348/231.99 |
| 2008/0270635 A1* | 10/2008 | Nakahama | 710/8 |
| 2009/0089850 A1* | 4/2009 | Nakajima et al. | 725/118 |
| 2009/0091656 A1* | 4/2009 | Kitaru et al. | 348/554 |
| 2009/0141180 A1* | 6/2009 | Kondo et al. | 348/723 |
| 2009/0177818 A1* | 7/2009 | Shim et al. | 710/100 |

(Continued)

FOREIGN PATENT DOCUMENTS

| | | |
|---|---|---|
| JP | 2007-078980 A | 3/2007 |
| JP | 2007-288407 A | 11/2007 |

(Continued)

*Primary Examiner* — Tuan Ho
*Assistant Examiner* — Selam Gebriel
(74) *Attorney, Agent, or Firm* — Canon USA, Inc. IP Division

(57) ABSTRACT

In case a video display apparatus is connected to a video output apparatus using communication means that disconnects an electrical connection in accordance with stop of power supply from the video output apparatus is operating in an operation mode where an output of video data is restarted after an output of video data is temporarily stopped, control is performed so that the electrical connection is not disconnected. In a state where in accordance with supply power from the video output apparatus, a control signal for establishing an electrical connection via the communication means is in an ON level, in case stop of the power supply is detected, if the video output apparatus is in an operation mode where an output of video data is restarted after an output of video data is temporarily stopped, control is performed so that the control signal is not changed to an OFF level.

15 Claims, 9 Drawing Sheets

(56) References Cited

U.S. PATENT DOCUMENTS

| | | | |
|---|---|---|---|
| 2009/0316017 A1* | 12/2009 | Ichii et al. | 348/222.1 |
| 2009/0322855 A1* | 12/2009 | Abe | 348/14.12 |
| 2009/0322944 A1* | 12/2009 | Kitamori et al. | 348/554 |
| 2010/0003016 A1* | 1/2010 | Ishimaru | 386/117 |
| 2010/0017645 A1* | 1/2010 | Kimoto | 714/4 |
| 2010/0020183 A1* | 1/2010 | Kimoto et al. | 348/207.11 |
| 2010/0070783 A1* | 3/2010 | Okamoto et al. | 713/310 |
| 2011/0001863 A1* | 1/2011 | Wang | 348/333.01 |
| 2011/0032367 A1* | 2/2011 | Ugawa et al. | 348/211.1 |
| 2011/0047586 A1* | 2/2011 | Koizumi et al. | 725/118 |
| 2011/0068736 A1* | 3/2011 | Chartier et al. | 320/107 |

FOREIGN PATENT DOCUMENTS

| | | |
|---|---|---|
| JP | 2008-159176 A | 7/2008 |
| JP | 2010-010855 A | 1/2010 |
| JP | 2010-028553 A | 2/2010 |

* cited by examiner

FIG. 4

| PHYSICAL ADDRESS | LOGICAL ADDRESS | VENDOR ID | DEVICE TYPE |
|---|---|---|---|
| [1.0.0.0] | 4 | 000000 (hex) | IMAGE CAPTURE APPARATUS |

VIDEO DISPLAY APPARATUS, CONTROL METHOD FOR VIDEO DISPLAY APPARATUS, VIDEO OUTPUT APPARATUS, AND CONTROL METHOD FOR VIDEO OUTPUT APPARATUS

This application is a Continuation of International Application No. PCT/JP2010/053836, filed Mar. 9, 2010, which is hereby incorporated by reference herein in its entirety.

TECHNICAL FIELD

The present invention relates to a video display apparatus and a control method therefor having the function of receiving and processing video data output from a video output apparatus and displaying a result on a display unit, and relates to a video output apparatus and a control method therefor capable of outputting video data to the video display apparatus.

BACKGROUND ART

Recently, in order to connect a video output apparatus such as a digital camera to a video display apparatus such as a monitor, it is general to use an HDMI (High-Definition Multimedia Interface) that is an interface for video data transmission.

In an HDMI, information is transmitted between connected devices mainly using a TMDS (Transition Minimized Differential Signaling) channel, a CEC (Consumer Electronics Control) channel, and a DDC (Display Data Channel).

The TMDS channel is a signal line that transmits video data, audio data, and auxiliary data. Further, the CEC channel is a signal line that transmits a device control signal. The use of communication using CEC commands (hereinafter referred to as CEC communication) enables a video display apparatus and an image capture apparatus to mutually acquire device information or one of them to control the other and vice versa.

The DDC is a signal line that transmits EDID (Extended Display Identification Data) (communication using a DDC is hereinafter referred to as DDC communication).

The EDID contains, in addition to display performance information such as resolution information indicating the display capabilities of the video display apparatus and audio output performance, physical address information for identifying a physical connection position of a connected device. Besides, the HDMI also has an HPD line used for the transmission of an HPD (Hot Plug Detect) signal described below, and a 5VPower line for supplying 5V power (hereinafter referred to as 5VPower) from the video data output side to the video data receiving side.

A video display apparatus connected to a video output apparatus via an HDMI determines, upon receipt of a 5VPower input from the video output apparatus, that a video data input request and a DDC communication access request have been issued, and switches the HPD (Hot Plug Detect) signal from an OFF level to an ON level. The video output apparatus detects that the HPD signal has been changed to the ON level via the HPD line, and newly starts DDC communication. Conversely, when the 5VPower supply is stopped in a state where the video output apparatus and the video display apparatus are electrically connected to each other, the HPD signal is switched from the ON level to the OFF level, and the electrical connection is disconnected.

In the DDC communication, the video output apparatus initially executes the process of acquiring EDID from the video display apparatus. When the EDID of the video display apparatus has been successfully acquired by the execution of the above process, the video output apparatus outputs video data to the video display apparatus.

Japanese Patent Laid-Open No. 2007-78980 describes a technique concerning DDC communication of an HDMI. In this technique, if video data transmitted from the transmitting device side has a different format from that set on the receiving device side, the receiving device once changes the HPD signal to the OFF level and then to the ON level, thereby once initializing the HDMI connection and executing new DDC communication. That is, this technique is used to forcibly disconnect an electrical connection by changing the HPD signal to the OFF level, and to allow the transmitting device to acquire EDID again to establish an electrical connection by changing the HPD signal again to the ON level.

Subsequently, as a preferred example in which a problem to be solved by the claimed invention occurs, a video processing system including a digital camera having a live view function and a video display apparatus connected to the digital camera using an HDMI will be described.

Recent single-lens reflex type digital cameras have a function called a live view function. The live view function is a function for capturing incident light transmitted through a lens using an image pickup element, converting the light into preview video data, and displaying the video data on a display device such as a liquid crystal screen of a digital camera in real time. A digital camera having the live view function allows a photographer to perform focus adjustment or photography while checking a live view image displayed on the display device instead of using a viewfinder. Therefore, the use of the live view function enables the confirmation of focus or composition before shooting still images even in photography performed at an angle at which the viewfinder is difficult to see.

Furthermore, a digital single-lens reflex camera having the live view function supports HDMI connections, thus allowing the digital camera to be connected to a video display apparatus such as a monitor so that live view video can be displayed on the screen of the monitor before being taken. The use of the above shooting method enables photography with confirmation of focus or composition using a large monitor instead of using a small liquid crystal screen of a digital camera, which is very convenient.

In a live view shooting mode in which photography is performed using live view video, however, a digital camera may temporarily stop video output, and, in some cases, the 5VPower supply of the HDMI may be stopped along with the stop of video output. Here, the configuration of a digital camera will be briefly described in order to describe the reason why video output is temporarily stopped in the live view shooting mode.

FIG. 9 is a configuration diagram illustrating a schematic configuration of a single-lens reflex type digital camera. A digital single-lens reflex camera 1000 serving as a video output apparatus includes, in the preceding stage of an image pickup element 1001, a movable mirror (reflector) 1002 that can advance and retract with respect to a photographic optical path by using a mirror drive unit 1007. In a normal time, the movable mirror 1002 is located at a position that is in the photographic optical path, and guides incident light transmitted through an image capture lens 1003 to a viewfinder 1004. The movable mirror 1002 is configured to, thereafter, immediately before photography, retract from the photographic optical path. Depending on whether or not the movable mirror 1002 is located at the position that is in the photographic optical path, the element to which the incident light is guided is alternately switched between the viewfinder 1004 and the image pickup element 1001. Further, the movable mirror 1002 includes a half mirror around the center thereof, and a sub-mirror 1006 for guiding object light transmitted through the half mirror to a focus control sensor 1005 is provided on a rear surface of this movable mirror. When the movable mirror 1002 retracts from the photographic optical path, the sub-mirror 1006 retracts in association therewith. When the movable mirror 1002 is in the photographic optical path, as described above, the sub-mirror 1006 is located at a position that is open with respect to the movable mirror 1002 in order to guide the object light to the focus control sensor 1005.

In the live view shooting mode, meanwhile, a CPU 1011 of the digital single-lens reflex camera 1000 brings the movable mirror 1002 into a retraction state at a normal time so that a video data output unit 1008 converts object light captured by the image pickup element 1001 into video data. When the converted video data is not output to the outside of the camera, video generated from the video data is displayed on a display device (not illustrated) provided in the digital single-lens reflex camera 1000.

Further, when the video data is output to a video display apparatus connected via an HDMI, the CPU 1011 performs control to output the video data from an HDMI terminal 1010 as a TMDS data signal through an HDMI transmitter 1009.

Here, when a user presses a shutter button (not illustrated) in a state where video data is being output to the video display apparatus, that is, in a state where the movable mirror 1002 is caused to retract from the photographic optical path, the CPU 1011 controls the movable mirror 1002 to once enter the photographic optical path from the retraction state to perform focus control and then to be in the retraction state again. Consequently, the object light to be input to the image pickup element 1001 is temporarily interrupted, and the input of the video data to the video data output unit 1008 is also temporarily interrupted. Accordingly, no video data is input from the video data output unit 1008, and in some cases, the HDMI transmitter 1009 may execute control to stop the 5VPower supply to the video display apparatus. Thus, the video display apparatus recognizes that the HDMI connection has been stopped (disconnected), and changes the HPD signal from an ON level to an OFF level. Consequently, the electrical connection between the video display apparatus and the digital single-lens reflex camera 1000 is disconnected.

Thereafter, when the movable mirror 1002 is in the retraction state again, the input of the object light to the image pickup element 1001 and the input of an electrical signal to the video data output unit 1008 are restarted. Accordingly, the video data output unit 1008 again outputs video data to the HDMI transmitter 1009. Upon receipt of the input of the video data, the HDMI transmitter 1009 changes the 5VPower output to the ON level again using the input of the video data as a trigger, and provides 5VPower supply to the video display apparatus using a 5VPower line.

Upon detection of the occurrence of a 5VPower input, the video display apparatus determines that a video data input request and a DDC communication access request have been issued, and starts control for changing the HPD signal from the OFF level to the ON level.

In this manner, many battery-driven apparatuses such as digital cameras stop 5VPower supply when no video data is input to an HDMI transmitter from the video data output unit 1008. This is presumably because, due to the increase in power consumption which is caused by supply of power to an external apparatus even when no video data is output to the external apparatus, the reduction in driving time of the apparatuses is prevented.

As described above, on the video output apparatus side, 5VPower supply to a video display apparatus is provided at the time when new video data is input to a transmitter that outputs video data, and, conversely, if no video data is input to the transmitter, the 5VPower supply is stopped. On the video display apparatus side, the presence of a 5VPower input is associated with the state transition of the HPD signal. Thus, if no video data is input to the transmitter on the video output apparatus side, the video display apparatus automatically disconnects the electrical connection with the video output apparatus. This is a significant operation when power is turned off on the video output apparatus side or at the time of the transition of the video output apparatus from the live view shooting mode to the normal shooting mode. However, if, as in during photography in the live view shooting mode, the input of video data to the HDMI transmitter 1009 is temporarily stopped and immediately thereafter video data is re-input, it is not desirable that the electrical connection be disconnected.

The reason that it is not desirable that the connection be disconnected is to require much time to re-establish an HDMI connection. During the HDMI connection, in response to the occurrence of a 5VPower input, the video display apparatus turns the HPD signal to an ON level. On the video output apparatus side where the above state has been recognized, a request for acquiring EDID is issued using DDC communication, and the process for receiving the EDID sent from the video display apparatus is executed. The above series of processes requires much time. Consequently, on the video display apparatus side, no video is displayed for a long period of time from when photography is executed to when the video display apparatus acquires the EDID and restarts video output.

For example, a digital single-lens reflex camera, which is manufactured by CANON KABUSHIKI KAISHA (under the name of EOS7D in Japan), and a liquid crystal television, which is manufactured by Toshiba Corporation (under the name of REGZA Z3500 in Japan), are connected using an HDMI cable, and the camera is set to the live view shooting mode. With the setting to this mode, the HDMI electrical connection process described above is performed, and finally live view video is displayed on a display screen of the television. When a shutter button of the camera is pressed in this state, the image displayed on the screen of the television disappears and about ten seconds are required until live view video output from the camera is displayed again, which has been found through the examination of the applicant. Similar problems also occur when an HDMI connection is set up between the digital single-lens reflex camera above, which is manufactured by CANON KABUSHIKI KAISHA, and a liquid crystal television, which is manufactured by Sony Corporation (under the name of KDL-40F1 in Japan), which has been confirmed by the applicant.

About ten seconds are required after photography in the live view shooting mode until live view video is displayed again on a video output apparatus because of, needless to say, the occurrence of electrical disconnection and connection processes for an HDMI connection. A live view video non-display period of about ten seconds can significantly reduce the efficiency of live view shooting, resulting in impairment of user convenience.

Japanese Patent Laid-Open No. 2007-78980 does not provide any consideration for the above problems concerning the change in the state of 5VPower supply that is caused by the stop and re-input of video data to the HDMI transmitter and the disconnection and connection processes for an HDMI connection which occur in correspondence therewith. Consequently, the technique disclosed in Japanese Patent Laid-Open No. 2007-78980 cannot solve the above problems.

It is to be understood that the above problems are not specific only to HDMIs. Similarly to HDMIs, any communication means that disconnects an electrical connection when the supply of power from a video output apparatus is interrupted may experience the above problems. Furthermore, not only digital cameras having the live view function but also apparatuses that output video to an external apparatus using communication means as described above and that stop supply of power when no video data is output to the external apparatus may experience the problems, as well as digital cameras.

As described above, it is an object of the present invention to provide a video output apparatus and a video display apparatus that displays video data output from the video output apparatus, which are connected using communication means that is configured to disconnect an electrical connection in accordance with the stop of the supply of power from the video output apparatus, wherein when the video output apparatus is operating in an operation mode in which after the output of video data to the video display apparatus is temporarily stopped, the output of video data is restarted, control is performed so that the electrical connection is not disconnected, thereby reducing the period of time during which no video is displayed on the video display apparatus.

SUMMARY OF INVENTION

In order to achieve the above object, a video display apparatus of the present invention is a video display apparatus that is connected to a video output apparatus via communication means capable of transmitting power, the video output apparatus outputting video data, and that displays video data input from the video output apparatus using the communication means, the video output apparatus being configured to supply power to the video display apparatus in accordance with an output of video data to the video display apparatus and to stop the supply of power in correspondence with stop of the output of video data, the video display apparatus including a detecting unit adapted to detect a state of supply of power output from the video output apparatus; an acquiring unit adapted to acquire information indicating an operation mode of the video output apparatus; and a control unit adapted to perform control to, in accordance with having been supplied with power from the video output apparatus, set a control signal for establishing an electrical connection with the video output apparatus via the communication means to an ON level to establish an electrical connection with the video output apparatus, and to, in case supply of power from the video output apparatus is stopped, disconnect the electrical connection with the video output apparatus by setting the control signal to an OFF level, wherein in case the detecting unit detects that the supply of power has been stopped in a state where the control signal is in the ON level, if the operation mode of the video output apparatus, which is acquired by the acquiring unit, is an operation mode in which after an output of video data is temporarily stopped, an output of video data is restarted, the control unit performs control so that the control signal is not changed to the OFF level.

Further, in order to achieve the above object, a video output apparatus of the present invention is a video output apparatus that is connected to a video display apparatus via communication means capable of transmitting power, the video display apparatus displaying input video data, and that outputs video data to the video display apparatus using the communication means, the video display apparatus being configured to be electrically connected to the video output apparatus via the communication means in accordance with having been supplied with power from the video output apparatus, the video output apparatus including control means for performing control to supply power to the video display apparatus when video data is to be output to the video display apparatus; and monitoring means for monitoring an operation mode of the video output apparatus, wherein when the monitoring means determines that the operation mode of the video output apparatus is an operation mode in which after an output of video data is temporarily stopped, an output of video data is restarted, the control means performs control so that power is constantly supplied for a period during which the video output apparatus is operating in the operation mode even if an output of video data to the video display apparatus has been stopped.

Further features of the present invention will become apparent from the following description of exemplary embodiments with reference to the attached drawings.

BRIEF DESCRIPTION OF DRAWINGS

FIG. 4 is a timing chart according to Exemplary Embodiment 1.

DESCRIPTION OF EMBODIMENTS

Exemplary embodiments of the present invention will be described hereinafter with reference to the accompanying drawings. The functions, names, etc. of constituent components described in an individual exemplary embodiment are not intended to limit the scope of the present invention unless otherwise stated.

Exemplary Embodiment 1

Figure 1:
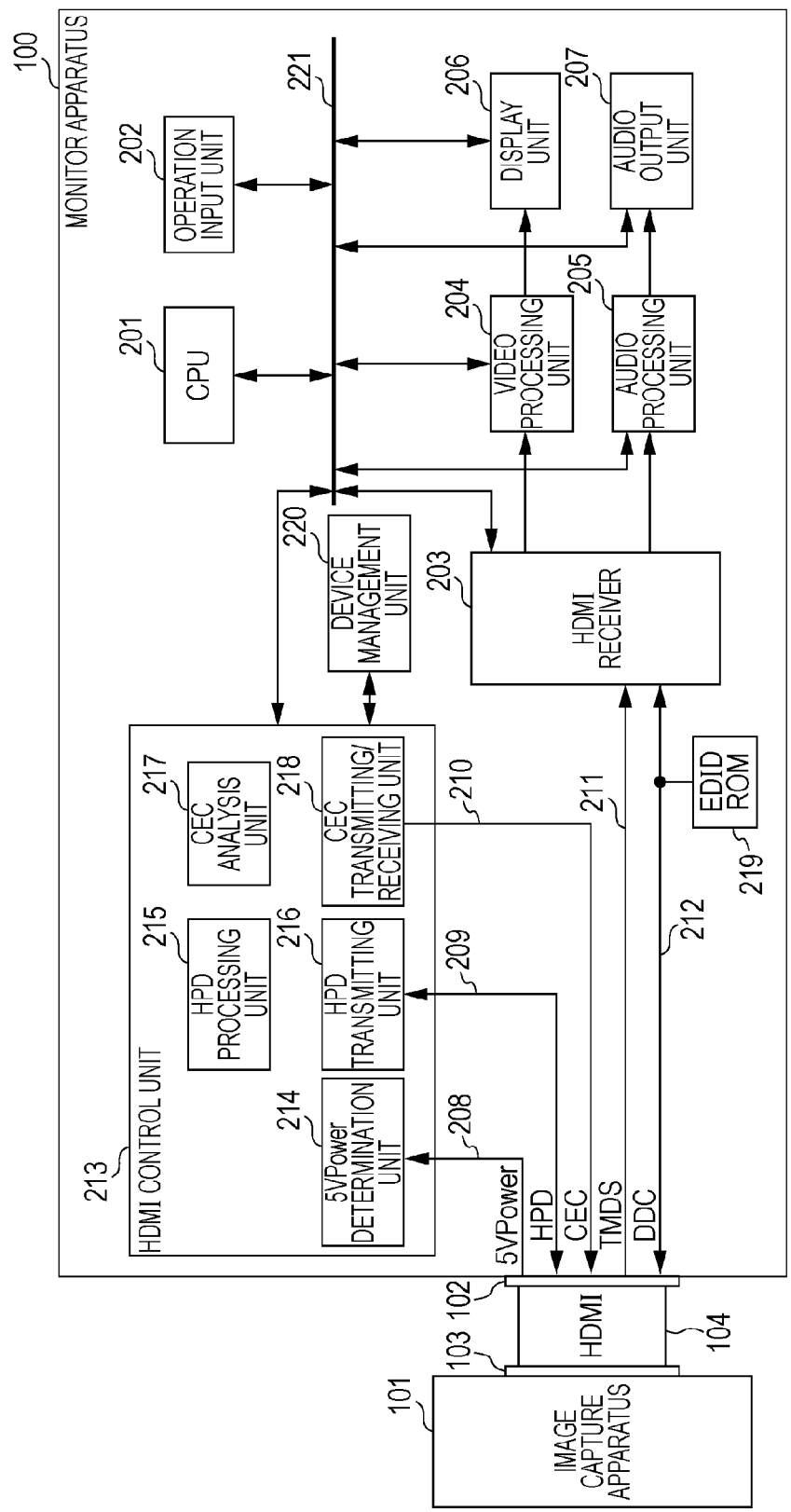
FIG. 1 is a block diagram in a video display system to which the present invention is applicable.

FIG. 1 is a schematic diagram illustrating a configuration of a video display system to which the present invention is applicable, and illustrates, in particular, a specific configuration of a monitor 100 serving as a video display apparatus.

An image capture apparatus 101 serving as a video output apparatus that outputs video data to the monitor 100 is connected to the monitor 100 via an HDMI standard compliant connection line (HDMI cable) that is capable of transmitting power. The monitor 100 can display video data output from the image capture apparatus 101 on a display unit 206 described below.

Figure 9:
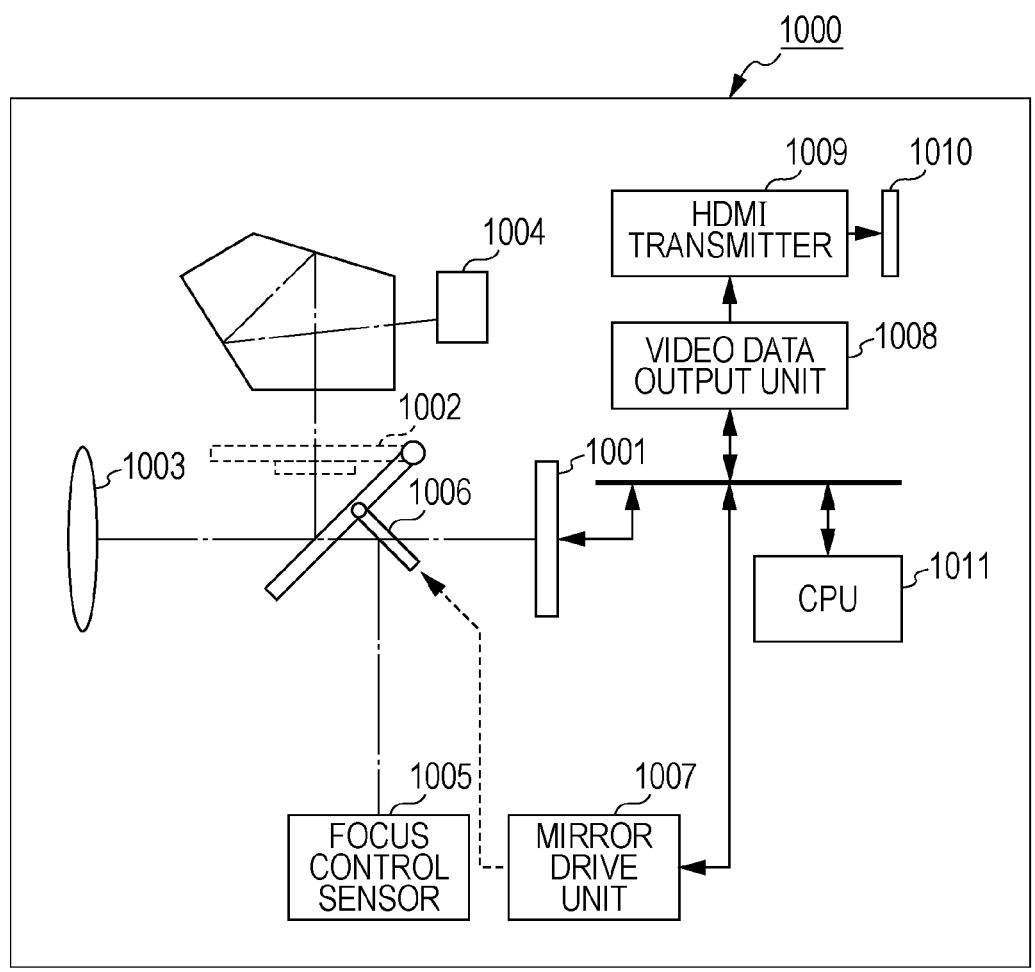
FIG. 9 is a schematic configuration diagram of a conventional digital single-lens reflex camera.

Since the configuration of the image capture apparatus 101 corresponds to that of a single-lens reflex type digital camera described in the Background Art section and the internal configuration thereof is the same as that illustrated in FIG. 9, the descriptions thereof are omitted. The image capture apparatus 101 has a normal shooting mode that allows a photographer to photograph an object image while observing the object image using a viewfinder, and a live view shooting mode. The live view shooting mode is a function for capturing incident light transmitted through a lens using an image pickup element, converting the incident light into preview video data, and displaying the preview video data on a display device such as a liquid crystal screen of the digital camera in real time. A digital camera having the live view shooting mode enables a photographer to perform focus adjustment or photography while checking a live view image displayed on the display device instead of using the viewfinder. Therefore, the use of the live view function enables the confirmation of focus or composition before shooting still images even in photography performed at an angle at which the viewfinder is difficult to see. In the live view shooting mode, when the image capture apparatus 101 is connected to the monitor 100 using an HDMI cable, it is assumed that live view video is output to the display unit 206 of the monitor 100 via the HDMI cable.

Further, if the input of video data to an HDMI transmitter on the image capture apparatus 101 side is stopped during the output of video data to the monitor 100 connected via an HDMI cable, the HDMI transmitter also stops the 5VPower output. That is, the image capture apparatus 101 has a configuration in which video data and 5VPower are output to the outside in parallel.

A CPU 201 comprehensively controls the overall operation of the monitor 100 in accordance with a program stored in a ROM (not illustrated) connected via a bus 221, using a RAM (not illustrated) as a work memory. The CPU 201 further controls an individual functional unit in accordance with an instruction from a user which is input from an operation input unit 202.

An HDMI receiver 203 converts video data and audio data that are input from an HDMI port 102 into a data structure that can be output on the display unit 206 of the monitor 100, and outputs resulting data to a video processing unit 204 and an audio processing unit 205.

The video data input to the video processing unit 204 is subjected to signal processing such as image quality improvement processing, and is finally displayed on the display unit 206 as video that can be visually perceived by the user. The audio data output to the audio processing unit 205 is subjected to signal processing such as audio quality improvement processing, and is output from an audio output unit 207 as audio.

The HDMI port 102 includes a TMDS line 211, a 5VPower line 208, and a DDC line 212. The HDMI port 102 further includes an HPD line 209 and a CEC line 210 serving as control signal lines. It is to be understood that these lines are also mounted in an HDMI cable 104 connected to the HDMI port 102, and respective lines in the HDMI cable 104 are connected to the corresponding lines in the monitor 100 via the HDMI port 102. The description of the respective lines in the monitor 100 will be described hereinafter.

An HDMI control unit 213 includes a 5VPower determination unit 214, an HPD processing unit 215, an HPD transmitting unit 216, a CEC analysis unit 217, and a CEC transmitting/receiving unit 218. The above functional units provided in the HDMI control unit 213 are controlled by a program stored in a ROM provided in the CPU 201 or a sub-microcomputer (not illustrated). Further, the HDMI control unit 213 itself comprehensively controls the respective functional units described above under the management of the HDMI control unit 213, and also executes various types of control according to HDMI communication.

The TMDS line 211 is a signal line for sending video data, audio data, and auxiliary data from the image capture apparatus 101 to the monitor 100. The DDC line 212 is a signal line for sending and receiving EDID between the monitor 100 and the image capture apparatus 101. The TMDS line 211 and the DDC line 212 are connected to the HDMI receiver 203. An EDID ROM 219 is further connected to the DDC line 212.

The EDID ROM 219 serving as means for storing device information about the monitor 100, that is, the EDID of the monitor 100, stores various information such as the display performance of the display, address information about the HDMI port 102, which is used in CEC communication, such as physical addresses, and the like. The EDID ROM 219 further stores an individual physical address for the HDMI port 102. In the present invention, the monitor 100 is provided with only one HDMI port, and physical address [1.0.0.0] is stored in the EDID ROM 219.

The HPD line 209 directed from the HDMI port 102 is connected to the HPD transmitting unit 216 included in the HDMI control unit 213. The HPD line 209 is a line for notifying the image capture apparatus 101 that DDC access is ready.

The HPD transmitting unit 216 controls an HPD signal so that the potential of the HPD line is set to one of a high-voltage high state (ON level) and a low-voltage low state (OFF level). The HPD signal serves as a control signal for establishing and disconnecting an electrical connection between the monitor 100 and the image capture apparatus 101. When the potential is at a high state, DDC access is ready in the HDMI port 102, and DDC access is turned on. When the potential is at a low state, DDC access is turned off. According to the HDMI standard, the high state indicates the voltage range of 2.4 V to 5.3 V, and the low state indicates the voltage range of 0 V to 0.4 V. The image capture apparatus 101 recognizes that DDC access has been turned on, and executes an EDID acquisition process using a DDC channel.

The CEC line 210 directed from the HDMI port 102 is connected to the CEC transmitting/receiving unit 218 included in the control unit. The CEC line 210 is a line for performing CEC communication between the monitor 100 and the image capture apparatus 101, and is bus-connected.

Upon receipt of a CEC command from the image capture apparatus 101, the monitor 100 performs command analysis using the CEC analysis unit 217, and accumulates information about the connected device in a device management unit 220. Here, information about a device includes, for example, a physical address associated with an HDMI port to which a device is connected, a logical address indicating a device type, a vendor ID indicating a manufacturing company, a device name used to notify a user of a connected device, and so on.

Upon receipt of notification of the state of 5VPower supply from the 5VPower determination unit 214, the HPD processing unit 215 determines, based on device management information held in the device management unit 220, whether control for switching the state of the HPD signal is necessary or not. The HPD transmitting unit 216 controls the switching between the high state and the low state of the HPD signal on the basis of a determination result of the HPD processing unit 215.

The HDMI receiver 203 decrypts the video data and audio data supplied from the HDMI port 102, and outputs the decrypted data to the video processing unit 204.

Figure 2:
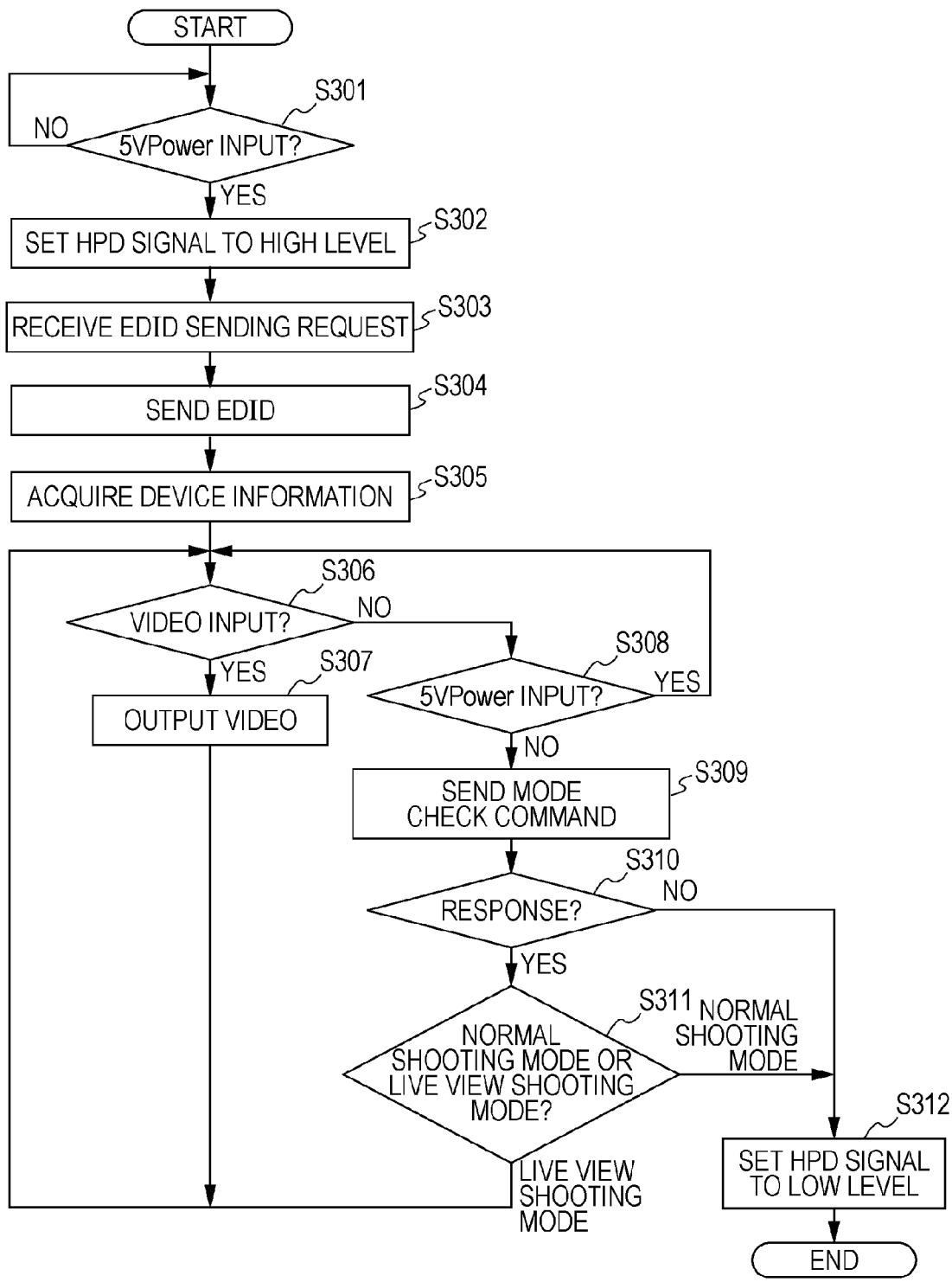
FIG. 2 is a flowchart illustrating a control flow according to Exemplary Embodiment 1.

Next, the control of the present exemplary embodiment will be described using a flowchart of FIG. 2. FIG. 2 is a flowchart illustrating a control procedure of the present exemplary embodiment. It is assumed that the monitor 100 is connected to the image capture apparatus 101 using the HDMI cable 104.

In step S301, the 5VPower determination unit 214 waits while detecting whether or not a 5VPower input (power supply) from the image capture apparatus 101 occurs. When the image capture apparatus 101 to which the HDMI cable 104 is being connected is turned off or is in the normal shooting mode, 5VPower input is not performed. Conversely, when the image capture apparatus 101 is in the live view shooting mode or in a reproduction mode, video data is output to the monitor 100 and accordingly the 5VPower input is continuously performed. When the 5VPower determination unit 214 detects the occurrence of a 5VPower input, the process is caused to proceed to step S302.

In step S302, the HPD processing unit 215 performs setting for switching the HPD signal, which has been set to a low level, to a high level. Through this process, the process for starting an electrical connection with the image capture apparatus 101, such as turning on DDC access in the HDMI port 102 of the monitor 100, is started.

Subsequently, in step S303, the HDMI control unit 213 receives an EDID sending request from the image capture apparatus 101 via DDC communication. Specifically, a slave address and a read command are sent from the image capture apparatus 101 side where the transition of DDC access to the ON state has been detected using, as a trigger, turning the HPD signal to a high state to the EDID ROM 219 via the DDC line.

Upon receipt of the command, in step S304, the HDMI control unit 213 reads the EDID from the EDID ROM 219, and sends the EDID to the image capture apparatus 101 via the DDC line.

Subsequently, in step S305, the CEC analysis unit 217 of the HDMI control unit 213 of the monitor 100 analyzes device information sent from the image capture apparatus 101. Specifically, the CEC analysis unit 217 acquires information included in command parameters sent from the image capture apparatus 101 via the CEC line, such as a logical address, a vendor ID, and an operation mode, and analyzes the information. The analyzed device information is sent to the device management unit 220 of the monitor 100, and the device management unit 220 holds the acquired device information as a device control table. Through the foregoing process, the image capture apparatus 101 and the monitor 100 are in the state of having been electrically connected.

FIG. 4 illustrates information that is managed using a device control table. This device control table manages that a device connected to the HDMI port 102 has a logical address of 4 and a vendor ID of 000000. The logical address is information indicating a device identifier defined in the HDMI standard, and its value of 4 represents a reproducing apparatus. Further, in the present exemplary embodiment, a device type is also specified using a vendor command uniquely determined by manufactures (vendors) that provide the image capture apparatus 101 and the monitor 100. That is, the fact that a reproducing apparatus with a logical address of 4 is an image capture apparatus is also acquired and managed. Note that the method for specifying a device type is not limited to that using a vendor command.

Subsequently, in step S306, the HDMI control unit 213 acquires device information, and determines whether or not there is an input of video data from the image capture apparatus 101 via the TMDS channel. When there is an input of video data, in step S307, the CPU 201 performs the process for displaying the video data input to the HDMI receiver 203 on the display unit 206.

When a transition has occurred from a state where there is an input of video data to a state where there is no input of video data, the HDMI control unit 213 causes the process to proceed to step S308. In step S308, the 5VPower determination unit 214 determines whether or not there is a 5VPower input. When there is a 5VPower input, the process is caused to proceed to step S306 and waits for video to be input.

On the other hand, when the 5VPower determination unit 214 determines in step S308 that there is no 5VPower input, the process is caused to proceed to step S309. In step S309, the HDMI control unit 213 sends a mode check command to the image capture apparatus 101 via the CEC line. The mode check command is used to inquire about the current operation mode of the image capture apparatus 101. More specifically, the mode check command is sent in order for the monitor 100 to inquire the image capture apparatus 101 whether the operation mode of the image capture apparatus 101 has been set to the normal shooting mode or the live view shooting mode. Note that the mode check command is a command uniquely extended as a vendor command in CEC.

In step S309, the HDMI control unit 213 refers to the device control table, and sends the above mode check command when the device connected using the HDMI cable 104 is an image capture apparatus. Although not illustrated in FIG. 2, the HDMI control unit 213 determines whether the device information acquired in step S305 indicates an image capture apparatus or not, and performs control to send a mode check command when the acquired device information indicates an image capture apparatus. For example, when it is determined that the connected device is a Blu-ray recorder to which 5VPower supply is turned on/off in accordance with the turn-on/off of the power of the apparatus, the process can be caused to proceed to step S312 immediately when the 5VPower input is stopped.

However, the video output apparatus in the present invention is not limited to an image capture apparatus. Therefore, depending on the type of the device indicated by the acquired device information, it is determined whether or not the apparatus is that to which the control in the present exemplary embodiment is to be applied.

When there is no input of information in step S310 in response to the mode check command from the image capture apparatus 101 for a predetermined period of time, the HDMI control unit 213 determines that the HDMI connection between the image capture apparatus 101 and the monitor 100 has been shut down. The shutdown of the HDMI connection is a state such as, for example, a state where the image capture apparatus 101 has been turned off or a state where the HDMI cable 104 has been removed from the HDMI port 102. Thus, in step S312, the HDMI control unit 213 issues an instruction to the HPD processing unit 215, and the HPD processing unit 215 performs setting for switching the HPD signal from a high level to a low level. Therefore, the monitor 100 enters the state where the HDMI connection with the image capture apparatus 101 has been disconnected.

When, in step S310, information indicating a shooting mode has been input from the image capture apparatus 101 via the CEC line in response to the mode check command for the predetermined period of time, the process is caused to proceed to step S311.

In step S311, the CEC analysis unit 217 determines whether the information indicating a shooting mode, which has been sent from the image capture apparatus 101, is information indicating the normal shooting mode or information indicating the live view shooting mode. When the information sent from the image capture apparatus 101 is information indicating the normal shooting mode, the process is caused to proceed to step S312.

Examples of the transition from the state where video data is output from the image capture apparatus 101 to the monitor 100 to the normal shooting mode may include the transition of the image capture apparatus 101 from an image reproduction mode to the normal shooting mode and the transition from the live view shooting mode to the normal shooting mode. In either case, due to the occurrence of a transition to the normal shooting mode, no video data is input to the HDMI transmitter inside the image capture apparatus 101 and consequently, no video data is input to the monitor 100. Therefore, the 5VPower supply from the image capture apparatus 101 to the monitor 100 is stopped. In accordance with the stop of the 5VPower supply, the monitor 100 sets the HPD signal to a low level, and disconnects the HDMI electrical connection.

On the other hand, when the information sent from the image capture apparatus 101 is information indicating the live view shooting mode, it is determined that because the shutter button has been pressed during live view shooting, video input has been temporarily stopped and accordingly the 5VPower input has also been stopped. Thus, the HDMI control unit 213 causes the process to proceed to step S306 while maintaining the HPD signal at a high level, and waits for video to be input again.

The control flow in the present exemplary embodiment has been described. The present exemplary embodiment has been described using, as a video output apparatus, an image capture apparatus having the live view shooting mode, that is, a digital single-lens reflex camera. Therefore, in step S311, the control is separated by two options: the live view shooting mode and the normal shooting mode. However, as also described in step S309, the video output apparatus is not limited to a digital single-lens reflex camera. Therefore, when it is suitable that another type of video output apparatus has an operation mode in which after the output of video data is temporarily stopped, the output of video data is restarted and that control is performed to maintain the HPD signal to a high level in this operation mode, in step S311, it may be determined whether the video output apparatus is in this operation mode or not.

Subsequently, a process based on the above control flow will be described using a timing chart illustrated in FIG. 3.

Figure 3:
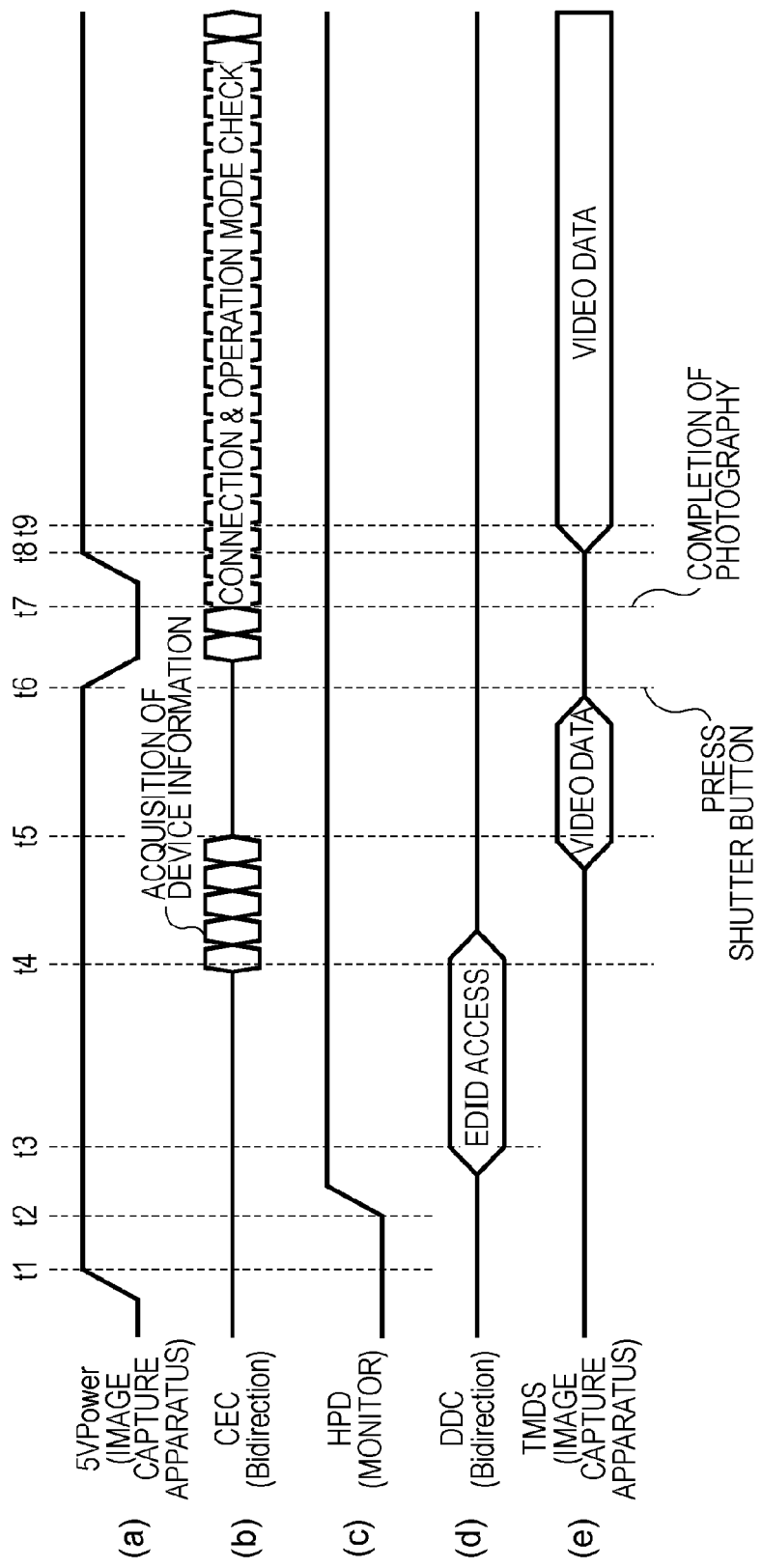
FIG. 3 is a schematic diagram illustrating a device control table according to Exemplary Embodiment 1.

Parts (a) to (e) of FIG. 3 illustrate the input timing of various signals (data) at the HDMI port 102. Part (a) illustrates a change in voltage in the 5VPower line 208, and corresponds to the state of a 5VPower input from the image capture apparatus 101. Part (b) illustrates the state of a command being sent and received in the CEC line 210. Further, part (c) illustrates a change in voltage in the HPD line 209 of the monitor 100. Part (d) illustrates an access state of the DDC line 212. Finally, part (e) illustrates a transmission state of video data that has been output from the image capture apparatus 101 and that passes through the TMDS line 211.

First, at time t1, it is assumed that the image capture apparatus 101 is set to the live view shooting mode. Since the live view shooting mode has been set, a 5VPower input from the image capture apparatus 101 via the 5VPower line 208 is performed. Upon receipt of a 5VPower input, the 5VPower determination unit 214 determines that video output from the image capture apparatus 101 occurs on the basis of the voltage value of the 5VPower line 208. Then, at time t2, the HPD processing unit 215 switches the HPD signal from a low state to a high state. Thereafter, at time t3, a request for sending EDID is transmitted from the image capture apparatus 101 to the monitor 100 via the DDC line, and the monitor 100 executes the process for sending the EDID to the image capture apparatus 101.

When the process for sending the EDID has completed, at time t4, device information is sent from the image capture apparatus 101 via the CEC line 210. When the sending/receiving of the device information has completed, an electrical connection is established. Thereafter, at time t5, video data is input from the image capture apparatus 101 via the TMDS line 211. In the monitor 100, the input video data is processed and is displayed on the display unit 206.

Through the foregoing process, video data converted from object light captured using an image pickup element of the image capture apparatus 101 that has been set to the live view shooting mode is in the state of having been input to the monitor 100 via the HDMI cable 104. In this state, it is assumed that a user presses the shutter button of the image capture apparatus 101 at time t6. In this case, as described in the Background Art of the present invention, the 5VPower supply from the image capture apparatus 101 to the monitor 100 is stopped, and the input of video data to the monitor 100 is also temporarily stopped. During this period, the monitor 100 sends a mode check command to the image capture apparatus 101 via the CEC line 210, and determines the operation mode of the image capture apparatus 101 in accordance with a response result. That is, after time t6, the monitor 100 executes the processing of steps S309, 5310, and 5311 illustrated in FIG. 2. In the related art, at the time when the 5VPower input is stopped, the HPD signal is changed to a low level and the HDMI connection is electrically disconnected. According to the present exemplary embodiment, however, when it is determined that the 5VPower input is in the state of having been disconnected in the live view shooting mode, the HPD signal is maintained at a high level, and is not changed to a low level.

Thereafter, in accordance with the completion of the photography process at time t7, at time t8, the image capture apparatus 101 attempts to restart the output of video data so that live view video can be output to the monitor 100. Therefore, a 5VPower input again from the image capture apparatus 101 to the monitor 100 is performed in accordance with the restart of the output of video data. However, in the monitor 100, since the HPD signal is maintained at a high level, even when a 5VPower input is performed again, the connection process such as sending and receiving EDID may not be executed again. Consequently, video data input again from the image capture apparatus 101 can be immediately displayed at time t9.

Figure 5:
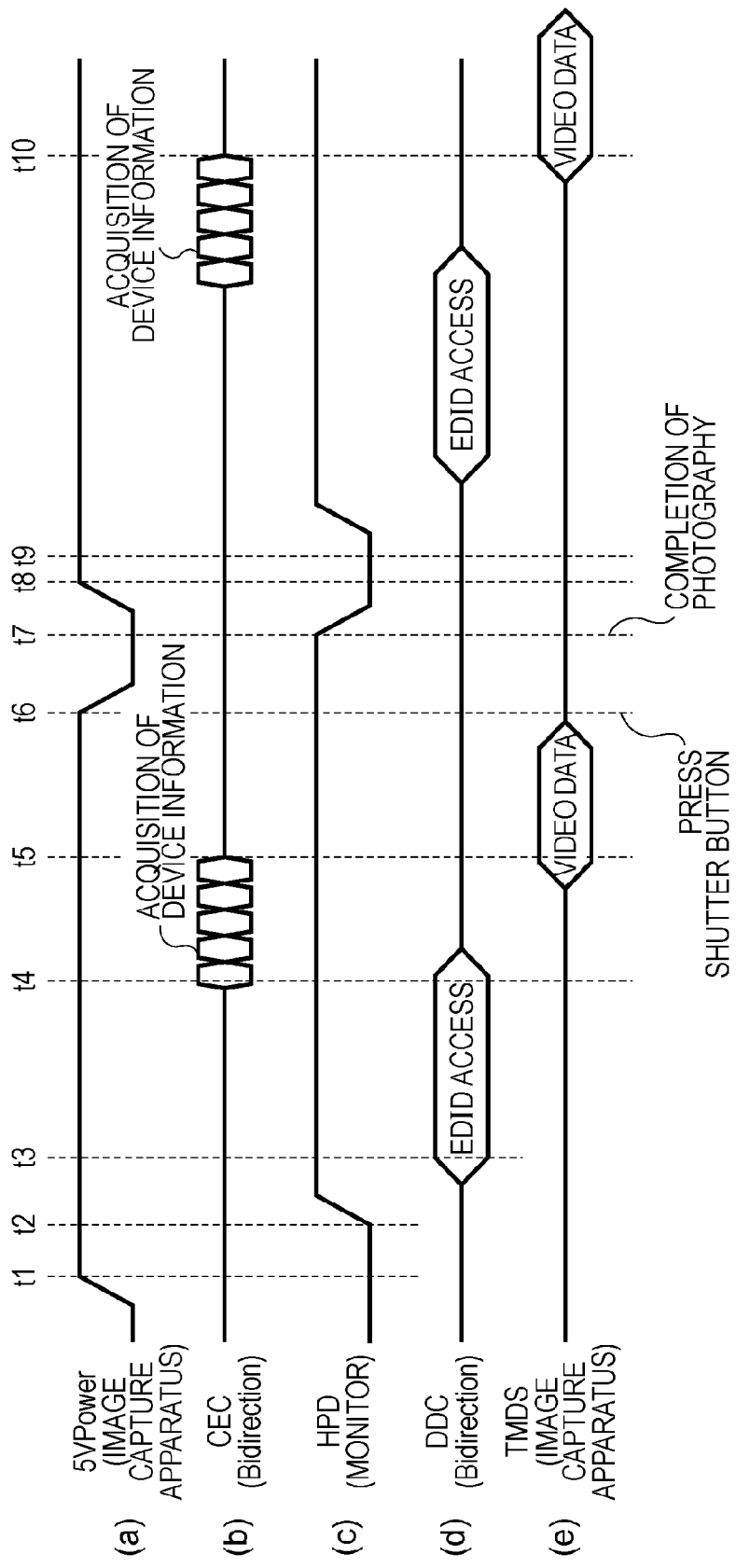
FIG. 5 is a timing chart in a case where a conventional technique is applied.

FIG. 5 is a timing chart in the monitor 100 to which the present invention is not applied, that is, the content described in the Background Art and Problem sections of the present invention. As illustrated in the timing chart, in accordance with the shutter button having been pressed at time t6, the 5VPower input to the monitor 100 is also stopped. In response to the stop, the HPD signal is also switched from a high level to a low level. Thus, even when the 5VPower input is performed again at time t8, a process similar to the process performed for the period from time t1 to time t5 is repeated, and video data of the live view video can be output using the display unit 206 of the monitor 100 at time t10. According to the control described in the present exemplary embodiment, the time taken when live view video is displayed again after live view shooting, generally up to time t10, can be reduced to the time illustrated in the timing chart described above.

As described above, in the present exemplary embodiment, the image capture apparatus 101 in which the external output of video data and 5VPower external supply are associated with each other, and the monitor 100 that displays the video data output from the image capture apparatus 101 are connected using an HDMI that is configured to disconnect an electrical connection in accordance with the stop of 5VPower supply. When the image capture apparatus 101 is operating in the live view shooting mode, control is performed so that even if the 5VPower supply from the image capture apparatus 101 to the monitor 100 is stopped, the HPD signal is maintained at a high state. Therefore, when photography is performed in the live view shooting mode, the period during which no live view video is displayed on the monitor 100 after photography can be reduced compared to the related art.

Note that, many monitors serving as video display apparatuses have a function for, upon detection of the stop of the input of video data from an external video output apparatus, automatically changing to a suspend state or switching to the input of another video output apparatus. This function is a function for preventing the occurrence of a non-display state of video. In the present exemplary embodiment, even when the 5VPower supply is stopped, in the live view shooting mode, the HPD signal is maintained at a high level, thereby allowing continuation of the electrical connection of the HDMI. However, if, regardless of the maintenance of the connection state of the HDMI, the monitors execute the above functions, as a result, even when a re-input of video data occurs from the image capture apparatus 101, much time is required until video data is displayed again. Such a situation is not desirable for users.

Therefore, when the CEC analysis unit 312 determines in step S311 that the operation mode of the image capture apparatus 101 is the live view shooting mode, the CPU 201 performs control so as not to execute the function of preventing the occurrence of a non-display state of video. That is, this control waits for video data to be re-input from the image capture apparatus 101 in an internal state that makes it possible to output video data received by the HDMI receiver 203 to the display unit 206. This control can avoid the consumption of time to display video data again as a result of the transition of the monitor 100 to the suspend state or the like although the electrical connection of the HDMI is maintained. It is to be understood that when the operation mode of the image capture apparatus 101 is a mode other than the live view shooting mode, the video non-display prevention function may be executed.

Exemplary Embodiment 2

Subsequently, a second exemplary embodiment of the present invention will be described with reference to the drawings. The functions, processes, etc., that are common to those explained in Exemplary Embodiment 1 described above will not be discussed.

In Exemplary Embodiment 1 described above, the time required until live view video is displayed again is reduced under the control of the monitor 100 side. In the present exemplary embodiment, in contrast, the time required until live view video is displayed again is reduced under the control of the image capture apparatus side.

Figure 6:
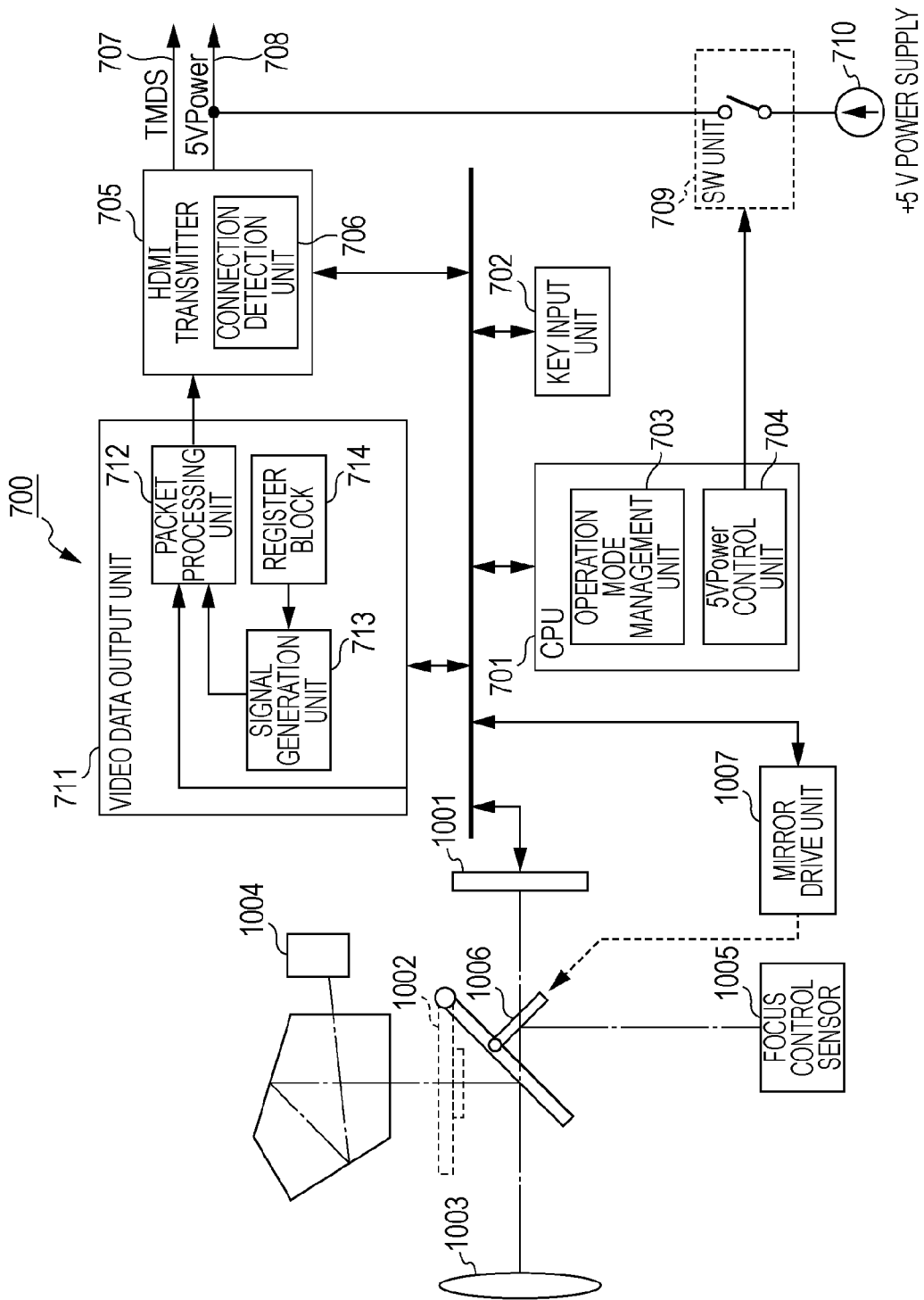
FIG. 6 is a block diagram of an image capture apparatus (digital single-lens reflex camera) according to Exemplary Embodiment 2.

FIG. 6 is a block diagram illustrating a structure of a digital single-lens reflex camera serving as an image capture apparatus 700 according to the present exemplary embodiment. This digital single-lens reflex camera has a normal shooting mode and a live view shooting mode. In the live view shooting mode, it is possible to output video data to a monitor via an HDMI terminal. Although a monitor is not shown in FIG. 6, it is assumed that a monitor similar to that described in the Background Art and Problem sections, rather than a monitor having the functions described in Exemplary Embodiment 1, is connected to the image capture apparatus via an HDMI cable. That is, the monitor in the present exemplary embodiment is configured to disconnect an electrical connection by changing the HPD signal to a low level in accordance with the 5VPower supply having been stopped via the HDMI cable.

First, a CPU 701 is connected to a ROM and a RAM (not illustrated) via a bus, and controls the overall operation of the image capture apparatus 700 using the RAM as a work memory in accordance with a program stored in the ROM. Further, the CPU 701 detects an instruction from a user, which has been input via a key input unit 702, and generates and outputs various commands or control signals for controlling the image capture apparatus 700.

An operation mode management unit 703 holds the operation mode specified by the key input unit 702, and manages the overall operation state of the image capture apparatus 700 to define the operation of each drive unit. For example, for the live view shooting mode, mode information thereabout and the advance/retraction state of a movable mirror with respect to the photographic optical path in this mode are held, and the operation transition of each drive unit and control unit such as a 5VPower control unit 704 and a video data output unit 711 described below is defined.

A connection detection unit 706 detects the bias level of a TMDS signal. A TMDS line 707 is configured such that an HDMI transmitter 705 serves as an open-drain current source and a receiver (not illustrated) serves as a differential receiver. The connection detection unit 706 detects a bias level by comparing the TMDS signal using a comparator or the like on the HDMI transmitter 705 side. The CPU 701 can check the connection state between the image capture apparatus 700 and the monitor by determining whether a bias has been applied or not. The connection detection unit 706 can also check a connection by sending a command to the monitor using CEC communication and by determining whether or not there is a response to the command.

A SW unit 709 is a SW circuit capable of short-circuiting and opening a +5V power supply 710 and a 5VPower line 708 of an HDMI terminal, and is controlled to be turned on and off by the 5VPower control unit 704.

A video data output unit 711 decodes a video signal generated from an optical signal received by an image pickup element 1001 in the live view shooting mode or photographic data recorded in a recording unit (not illustrated), and converts the decoded data into video data that can be output from the HDMI transmitter 705.

A signal generation unit 713 reads data held in a register block 714, generates video data using the data, and inputs the video data to a packet processing unit 712. The register block 714 holds R, G, and B data. For example, R=G=B=0 is held, thus allowing the output of mute video in which an active video region is set as a full black image.

The packet processing unit 712 outputs signal data of one of the video signal output from the image pickup element 1001 and the video signal generated by the signal generation unit 713 to the HDMI transmitter 705 in accordance with an instruction of the CPU 701.

The HDMI transmitter 705 is connected to a receiver on the monitor side via the HDMI cable 104, and outputs video data using the TMDS line 707.

The configuration of the image capture apparatus 700 according to the present exemplary embodiment has been described. The image pickup element 1001, the movable mirror 1002, the image capture lens 1003, the viewfinder 1004, the focus control sensor 1005, the sub-mirror 1006, and the mirror drive unit 1007 have a configuration similar to the configuration of those in the image capture apparatus described in the related art, and descriptions thereof are omitted.

Subsequently, the operation and control of the image capture apparatus 700 of the present invention will be described using flowcharts illustrated in FIGS. 7 and 8.

Figure 7:
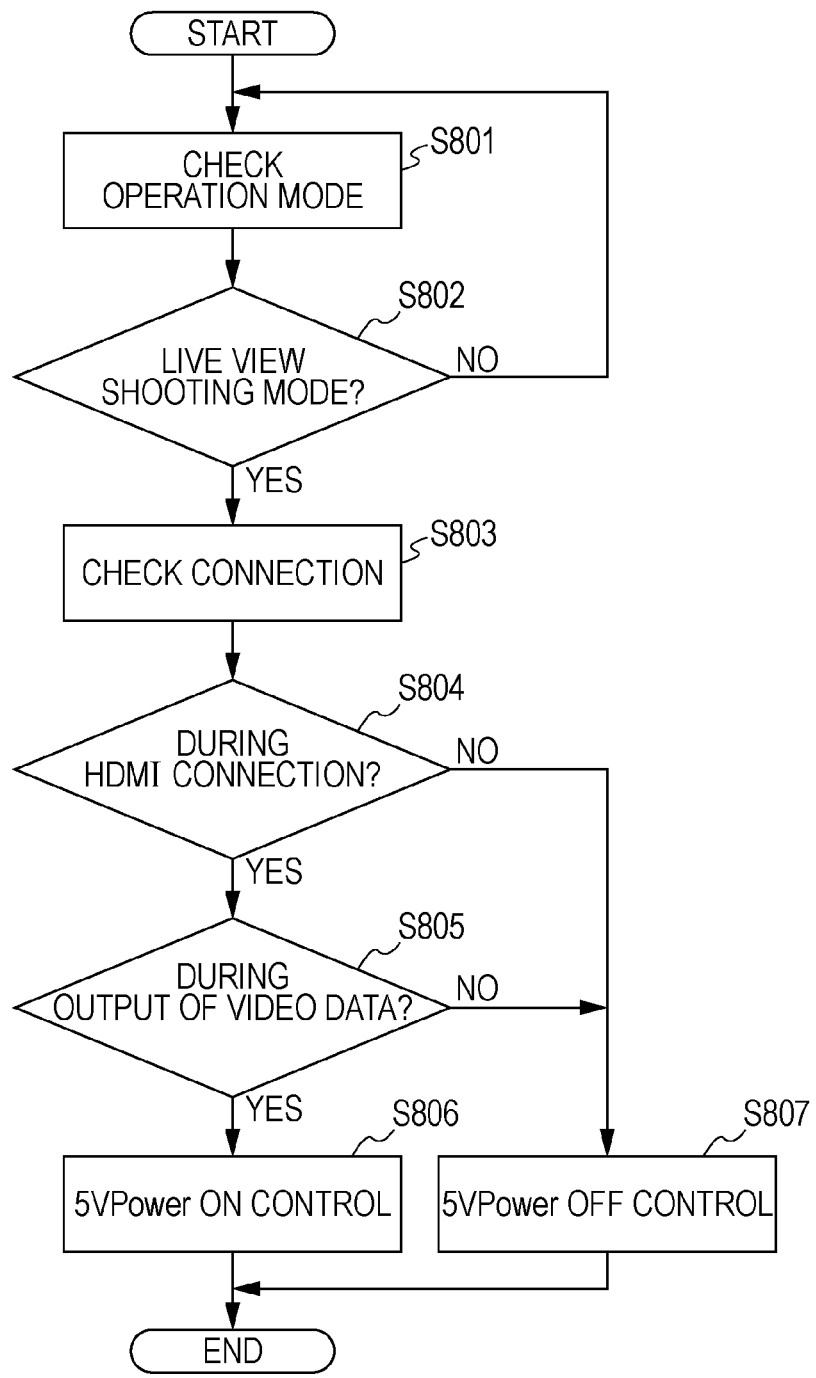
FIG. 7 is a flowchart illustrating a control flow according to Exemplary Embodiment 2.
Figure 8:
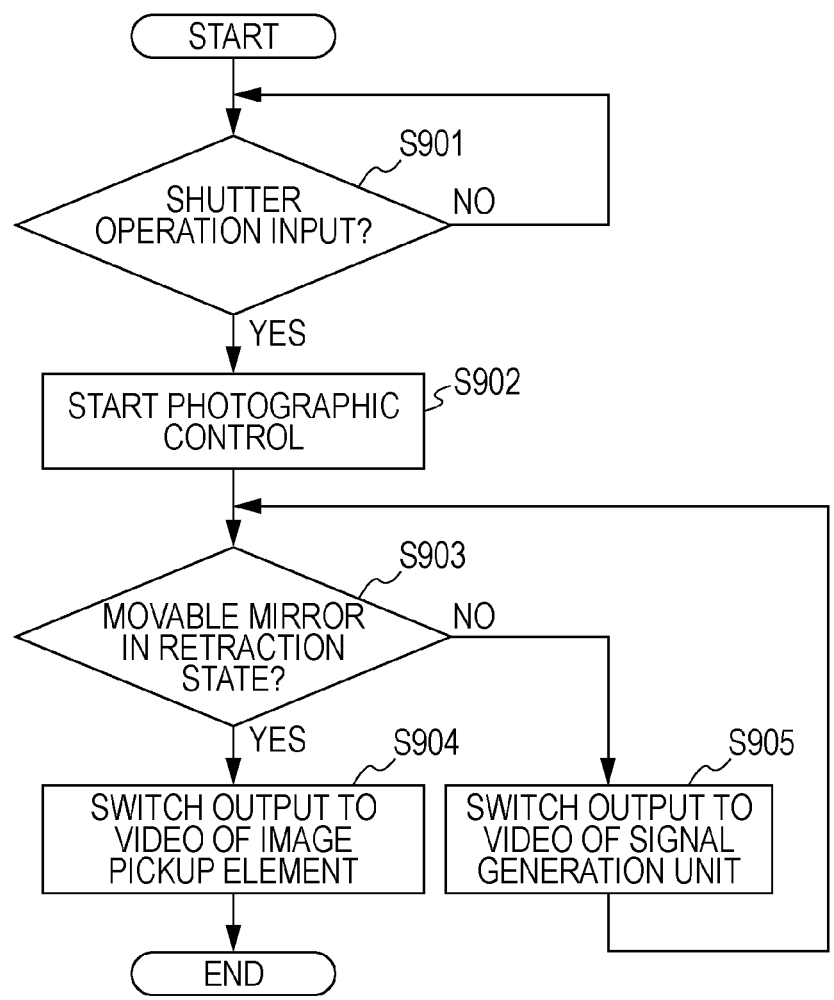
FIG. 8 is a flowchart illustrating the control flow according to Exemplary Embodiment 2.

FIG. 7 is a control flow when the image capture apparatus 700 is set to the live view shooting mode. First, in step S801, when the power of the image capture apparatus 700 is turned on, the CPU 701 starts the monitoring of the operation mode. When it is determined in step S802 that the operation mode has been set to the live view shooting mode, the CPU 701 causes the process to proceed to step S803, and controls the connection detection unit 706 to check the connection state of the HDMI cable. The connection detection unit 706 detects a connection in accordance with the bias level, and outputs the result to the CPU 701.

When the connection detection unit 706 determines that the HDMI cable has been connected, the CPU 701 causes the process to proceed to step S805. In step S805, the CPU 701 checks whether or not the video data output unit 711 is outputting video data to the HDMI transmitter 705. If video data is being output, the process proceeds to step S806.

In step S806, the CPU 701 performs control to short-circuit the SW unit 709 and to supply 5V power to the 5VPower line 708. On the other hand, when HDMI connection is not detected in step S804 or when video data is not being output to the HDMI transmitter 705 in step S805, the CPU 701 causes the process to proceed to step S807.

In step S807, the CPU 701 performs control to set the SW unit 709 to an open state and to set the 5VPower line 708 to a high-impedance state. That is, 5V power is prevented from being supplied from the 5V power supply to the 5VPower line 708.

A control flow when the image capture apparatus 700 is set to the live view shooting mode has been described. The above control allows the constant 5VPower supply to the 5VPower line in the live view shooting mode. Therefore, even when the shutter button is pressed in the live view shooting mode and the input of video data to the HDMI transmitter 705 is temporarily stopped, 5VPower supply to the monitor is continuously performed. On the monitor side, consequently, the HPD signal is maintained at a high state, and thus the electrical connection is not disconnected.

After the control illustrated in FIG. 7 has been performed, an operation actually performed when photography is performed in the live view shooting mode will be described with reference to FIG. 8. FIG. 8 is a control flow when a shutter button is pressed in the live view shooting mode.

In step S901, the CPU 701 monitors the press operation of the shutter button. In step S901, when the CPU 701 detects that the operation of pressing the shutter button has been performed, the operation proceeds to the photographing operation in step S902. In step S902, the CPU 701 controls the mirror drive unit 1007 to cause the movable mirror 1002 to once enter the photographic optical path from the retraction state.

In step S903, the CPU 701 determines whether the movable mirror 1002 has entered or retracted from the photographic optical path. When the movable mirror 1002 has entered the photographic optical path, the image pickup element 1001 is not exposed to light. Thus, no video data is input from the image pickup element 1001 to the video data output unit 711. Therefore, in the related art, no video data is input to the HDMI transmitter 705, resulting in the 5VPower transition to an OFF level and disconnection of the electrical connection on the monitor side. In the present exemplary embodiment, however, for a period during which the movable mirror 1002 is in the photographic optical path, 5V power is constantly supplied from the 5V power supply 710 to the 5VPower line, and therefore the electrical connection is maintained.

However, even when the 5VPower input is maintained, if there is no input of video data, some monitors may execute the non-display state prevention process such as bringing display state of the display unit of the monitor into a suspend state or switching to video of another input terminal. If such a prevention process has occurred, much time is required for the recovery from the prevention state to the video display state again. Furthermore, the occurrence of the non-display state prevention process on the monitor side each time live view shooting is executed would also be undesirable for a user.

In the present exemplary embodiment, therefore, during the execution of live view shooting, for a period of time during which no video data is input from the image pickup element 1001 to the HDMI transmitter 705, the video data output unit 711 inputs the video data generated by the signal generation unit 713 to the HDMI transmitter 705 as alternative video data on the basis of the control from the CPU 701. That is, the CPU 701 performs control so that video data can constantly be output to the monitor. This control can prevent the occurrence of the non-display prevention process on the monitor side, resulting in the immediate display of live view video on the display unit of the monitor when the movable mirror 1002 is in the retraction state (in the case of step S904).

When the movable mirror 1002 moves to the retraction position because of the completion of live view shooting, the CPU 701 performs control to perform switching so that the video data from the image pickup element 1001 in place of the alternative video data is input to the HDMI transmitter 705.

The control of the video output apparatus according to Exemplary Embodiment 2 has been described. The present exemplary embodiment has been described using a digital single-lens reflex camera having the live view shooting mode as a preferred example as a video output apparatus. However, the video output apparatus is not limited to a digital single-lens reflex camera. Therefore, when another type of video output apparatus has an operation mode in which after the output of video data is temporarily stopped, the output of video data is restarted and when it is suitable that the video display apparatus maintains the HPD signal at a high level in the operation mode, it may be determined in step S802 whether or not the video output apparatus is in this operation mode.

As described above, in the present exemplary embodiment, the image capture apparatus 700 and a monitor that displays video data output from the image capture apparatus 700 are connected using an HDMI that is configured to disconnect an electrical connection in accordance with the stop of 5VPower supply. When the image capture apparatus 700 is operating in the live view shooting mode, control is performed so that a 5VPower input from the image capture apparatus 700 to the monitor is constantly performed and so that the HPD signal state on the monitor side is maintained at a high state. Therefore, when photography is performed in the live view shooting mode, the period of time during which no live view video is displayed on the monitor after photography can be reduced. Furthermore, with regard to the non-display state prevention process that is automatically executed on the monitor side when there is no input of video data, control is performed so that video data can be constantly output. Thus, the execution of the non-display state prevention process can be suppressed.

In the described video output apparatus in the two exemplary embodiments, a predetermined action during a video output operation causes a situation in which there is no other way to temporarily stop the output of video. For purposes of most easily understanding this situation, a digital single-lens reflex camera having the live view shooting mode is used as a video output apparatus in each exemplary embodiment. However, an video output apparatus of the present invention is not limited to the digital single-lens reflex camera.

In addition, an HDMI serving as communication means in the present invention has been described as a unit that connects a video output apparatus and a video display apparatus using a physical wired cable. However, communication means of the present invention may also be used in wireless communication as far as the communication means is capable of supplying power from the video output apparatus to the video display apparatus and is controlled so as to switch the electrical connection in accordance with whether there is supply of power or not. Therefore, the establishment and disconnection of an electrical connection, as described in the foregoing exemplary embodiments and the claims, are not necessarily based on a physical connection using a wired cable. In the case of a wireless connection, the state where video data can be communicated can be the state where an electrical connection has been established.

The present invention is not limited to the foregoing embodiments, and a variety of changes and modifications can be made without departing from the spirit and scope of the present invention. Therefore, the following claims are appended in order to make explicit the scope of the present invention.

As described above, according to the present invention, a video output apparatus and a video display apparatus that displays video data output from the video output apparatus are connected using communication means that is configured to disconnect an electrical connection in accordance with the stop of the supply of power from the video output apparatus. When the video output apparatus is operating in an operation mode in which after the output of video data to the video display apparatus is temporarily stopped, the output of video data is restarted, control is performed so that the electrical connection is not disconnected. Therefore, it is possible to reduce the period of time during which no video is displayed on the video display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display apparatus that is connected to an output apparatus via communication means capable of transmitting power, the output apparatus outputting video data, and that displays video data input from the output apparatus using the communication means,
the output apparatus being configured to supply power to the display apparatus in accordance with an output of video data to the display apparatus and to stop the supply of power in correspondence with stop of the output of video data,
the display apparatus comprising:
a detecting unit adapted to detect a state of supply of power output from the output apparatus;
an acquiring unit adapted to acquire information indicating an operation mode of the output apparatus; and
a control unit adapted to perform control to, in accordance with having been supplied with power from the output apparatus, set a control signal for establishing an electrical connection with the output apparatus via the communication means to an ON level to establish an electrical connection with the output apparatus, and to, in case supply of power from the output apparatus is stopped, disconnect the electrical connection with the output apparatus by setting the control signal to an OFF level,
wherein in case the detecting unit detects that the supply of power has been stopped in a state where the control signal is in the ON level, if the operation mode of the output apparatus, which is acquired by the acquiring unit, is an operation mode in which after an output of video data is temporarily stopped, an output of video data is restarted, the control unit performs control so that the control signal is not changed to the OFF level.

2. The display apparatus according to claim 1, wherein in accordance with detection of stop of supply of power from the output apparatus by the detecting unit, the acquiring unit sends a command for requesting information indicating the operation mode to the output apparatus, and acquires the information indicating the operation mode, the information being sent from the output apparatus in accordance with the command.

3. The display apparatus according to claim 1, wherein in case the operation mode of the output apparatus, which is acquired by the acquiring unit, is an operation mode in which after an output of video data is temporarily stopped, an output of video data is restarted, the control unit performs control so that a prevention function for preventing occurrence of a non-display state of video data is not executed, the prevention function being executed in accordance with stop of an input of video data from the output apparatus.

4. A control method for a display apparatus that is connected to an output apparatus via communication means capable of transmitting power, the output apparatus outputting video data, and that displays video data input from the output apparatus using the communication means,
the output apparatus being configured to supply power to the display apparatus in accordance with an output of video data to the display apparatus and to stop the supply of power in correspondence with stop of the output of video data,
the control method for the display apparatus comprising the steps of:
detecting a state of supply of power output from the output apparatus;
acquiring information indicating an operation mode of the output apparatus; and
performing control, in accordance with having been supplied with power from the output apparatus, to set a control signal for establishing an electrical connection with the output apparatus via the communication means to an ON level to establish an electrical connection with the output apparatus, and to, in case supply of power from the output apparatus is stopped, disconnect the electrical connection with the output apparatus by setting the control signal to an OFF level,
wherein in case it is detected that the supply of power has been stopped in a state where the control signal is in the ON level, if the acquired operation mode of the output apparatus is an operation mode in which after an output of video data is temporarily stopped, an output of video data is restarted, the controlling step performs control so that the control signal is not changed to the OFF level.

5. An output apparatus that is connected to a display apparatus via communication means capable of transmitting power, the display apparatus displaying input video data, and that outputs video data to the display apparatus using the communication means, the display apparatus being configured to be electrically connected to the output apparatus via the communication means in accordance with having been supplied with power from the output apparatus, the output apparatus comprising:
a control unit adapted to control to supply power to the display apparatus if video data is to be output to the display apparatus; and
a monitoring unit adapted to monitor an operation mode of the output apparatus,
wherein in case the monitoring unit determines that the operation mode of the output apparatus is an operation mode in which after an output of video data is temporarily stopped, an output of video data is restarted, the control unit performs control so that power is constantly supplied for a period during which the output apparatus is operating in the operation mode even if an output of video data to the display apparatus has been stopped.

6. The output apparatus according to claim 5, further comprising an output unit adapted to, in case the operation mode is an operation mode in which after an output of video data is temporarily stopped, an output of video data is restarted, output alternative video data of the video data to the display apparatus for a period during which an output of video data is temporarily stopped.

7. The output apparatus according to claim 5, wherein the output apparatus is a digital camera including a mirror that alternately switches between a viewfinder and an image pickup element to which incident light transmitted through a lens is guided, and the operation mode is a live view shooting mode in which before a still image is photographed, video data obtained by capturing the incident light from the lens using the image pickup element is displayed on a display device.

8. A control method for an output apparatus that is connected to a display apparatus via communication means capable of transmitting power, the display apparatus displaying input video data, and that outputs video data to the display apparatus using the communication means, the display apparatus being configured to be electrically connected to the output apparatus via the communication means in accordance with having been supplied with power from the output apparatus, the control method for the output apparatus comprising the steps of:
performing control to supply power to the display apparatus when video data is to be output to the display apparatus; and
monitoring an operation mode of the output apparatus,
wherein in case it is determined that the operation mode of the output apparatus is an operation mode in which after an output of video data is temporarily stopped, an output of video data is restarted, the controlling step performs control so that power is constantly supplied for a period during which the output apparatus is operating in the operation mode even if an output of video data to the display apparatus has been stopped.

9. A display apparatus comprising:
a receiving unit that receives video data from an output apparatus;
a memory that stores information relating to the display apparatus;
a display unit that displays video based on video data received by the receiving unit;
a signal output unit that outputs a signal to the output apparatus, wherein the signal is used for informing the output apparatus that an acquisition of the information from the display apparatus is allowed; and
a control unit that (a) performs a process for changing a level of the signal to a first level to cause the output apparatus to obtain the information, and (b) does not perform, based on a response from the output apparatus, a process for changing the level of the signal to a second level even if the receiving unit does not receive video data from the output apparatus after the level of the signal is changed to the first level, wherein the first level is higher than the second level.

10. The display apparatus according to claim 9, wherein the control unit detects, based on a mode of the output apparatus, whether the receiving unit receives video data from the display apparatus.

11. The display apparatus according to claim 9, wherein the signal includes a signal relating to HPD (Hot Plug Detect).

12. The display apparatus according to claim 9, wherein the information includes information relating to display capabilities of the display apparatus.

13. The display apparatus according to claim 9, wherein the control unit does not perform a process for changing the level of the signal to the second level if the receiving unit receives video data from the output apparatus after the level of the signal is changed to the first level.

14. The display apparatus according to claim 9, wherein the control unit performs a process for changing the level of the signal to the second level if the response from the output apparatus is not detected after the level of the signal is changed to the first level.

15. A control method comprising:
receiving video data from an output apparatus;
displaying video based on video data received from the output apparatus;
performing a process for changing a level of a signal to a first level to cause the output apparatus to obtain information relating to a display apparatus, wherein the signal is used for informing the output apparatus that an acquisition of the information from the display apparatus is allowed; and
not performing, based on a response from the output apparatus, a process for changing the level of the signal to a second level even if video data is not received from the output apparatus after the level of the signal is changed to the first level, wherein the first level is higher than the second level.

* * * * *